(12) United States Patent
Rippelmeyer

(10) Patent No.: US 10,054,173 B2
(45) Date of Patent: Aug. 21, 2018

(54) INTEGRATED SNAP RING AND RETURN SPRING

(71) Applicant: Toyota Motor Engineering & Manufacturing North America, Inc., Erlanger, KY (US)

(72) Inventor: Luke A. Rippelmeyer, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 15 days.

(21) Appl. No.: 15/240,137

(22) Filed: Aug. 18, 2016

(65) Prior Publication Data

US 2018/0051755 A1  Feb. 22, 2018

(51) Int. Cl.
| F16D 25/0638 | (2006.01) |
| F16D 13/52 | (2006.01) |
| B60K 17/02 | (2006.01) |
| F16D 121/04 | (2012.01) |
| F16D 25/08 | (2006.01) |
| F16D 125/58 | (2012.01) |

(52) U.S. Cl.
CPC .......... *F16D 25/0638* (2013.01); *B60K 17/02* (2013.01); *F16D 13/52* (2013.01); *F16D 25/082* (2013.01); *F16D 2121/04* (2013.01); *F16D 2125/582* (2013.01)

(58) Field of Classification Search
None
See application file for complete search history.

(56) References Cited

U.S. PATENT DOCUMENTS

| 2,804,780 | A | * | 9/1957 | Gerst | F16H 3/093 |
| | | | | | 192/85.41 |
| 3,596,537 | A | * | 8/1971 | Koivunen | F16H 63/3026 |
| | | | | | 188/72.4 |
| 3,747,727 | A | * | 7/1973 | Dach | F16D 25/0638 |
| | | | | | 138/115 |
| 5,013,287 | A | | 5/1991 | Hayakawa et al. | |
| 5,893,445 | A | | 4/1999 | Dover | |
| 6,332,521 | B1 | * | 12/2001 | Shoji | F16D 25/0638 |
| | | | | | 192/55.61 |
| 2012/0061202 | A1 | | 3/2012 | Luipold et al. | |
| 2014/0332336 | A1 | * | 11/2014 | Akahane | F16D 13/72 |
| | | | | | 192/70.11 |
| 2016/0131200 | A1 | * | 5/2016 | Kim | F16D 13/52 |
| | | | | | 192/48.1 |

\* cited by examiner

*Primary Examiner* — Robert W Hodge
*Assistant Examiner* — Ryan P Dodd
(74) *Attorney, Agent, or Firm* — Christopher G. Darrow; Darrow Mustafa PC

(57) ABSTRACT

A brake or clutch assembly includes a piston that moves within a housing in response to fluid pressure and is engaged with a clutch pack. A ring-shaped return spring includes a plurality of coil springs extending axially from a face of the return spring. An outer periphery of the return spring is disposed in an annular groove in the housing which axially fixes the return spring in the housing. The springs are engaged with and bias the piston away from the clutch pack.

15 Claims, 8 Drawing Sheets

INTEGRATED SNAP RING AND RETURN SPRING

FIELD

The subject matter described herein relates in general to transmissions and, more particularly, to vehicle transmissions having a piston actuated brake.

BACKGROUND

Vehicle transmissions often have a brake actuated by a piston. The piston is positioned in a housing. An annular return spring is positioned in compression between the piston and its housing to bias the piston to its retracted position. The return spring is sized to fit inside the piston's housing. An annular snap ring holds the return spring in compression between the piston and its housing. The snap ring is contractible to a size where it fits inside the piston's housing, but expands to a size where it partially seats in a groove in the housing, and partially protrudes into the housing to hold the return spring.

During assembly of the transmission, the return spring is positioned against the piston and compressed to expose the housing's groove. The snap ring is contracted, positioned in the housing at the location of the housing's groove, and allowed to expand so that it seats in the housing's groove, with the remainder protruding into the housing to hold the return spring in compression between the piston and its housing.

Transmissions may be a large device with many components therein. The different components have different space requirements. It would be advantageous if the components could be reduced in size thereby providing additional space for other components and/or reducing the size of the transmission.

SUMMARY

A brake or clutch assembly includes a piston that moves within a housing in response to fluid pressure and is engaged with a clutch pack. A ring-shaped return spring includes a plurality of coil springs extending axially from a face of the return spring. An outer periphery of the return spring is disposed in an annular groove in the housing which axially fixes the return spring in the housing. The springs are engaged with and bias the piston away from the clutch pack.

In one respect, the present disclosure is directed to a fluid-operated clutch assembly. The clutch assembly includes a housing, a piston, a seal, a clutch pack and a return spring. The housing has an annular recess and an annular groove. The piston is disposed in the annular recess in the housing for axial displacement. The seal prevents passage of a fluid between the housing and the piston. The clutch pack has a set of friction discs intermixed with a set of separator plates. The return spring is a ring-shaped and disposed in the housing between the piston and the clutch pack. The return spring has axially opposite first and second surfaces, an outer periphery, an inner periphery, and a plurality of coil springs. The outer periphery is engaged in the annular groove and prevents axial movement of the return spring. The coil springs extend axially from the first surface and are engaged with and bias the piston away from the clutch pack.

In another respect, the present disclosure is directed to a fluid-operated clutch assembly. The clutch assembly includes a housing, a piston, a seal, a clutch and a ring-shaped return spring. The housing has an annular recess and an annular groove. The piston is disposed in the annular recess in the housing for axial displacement. The piston has a plurality of axially extending arms. The seal for prevents passage of a fluid between the housing and the piston. The clutch pack has a set of friction discs intermixed with a set of separator plates. The return spring is disposed in the housing between the piston and the clutch pack. The return spring has axially opposite first and second surfaces, an outer periphery, an inner periphery, a plurality of openings extending between the first and second surfaces, and a plurality of coil springs. The outer periphery is engaged in the annular groove and prevents axial movement of the return spring. The coil springs extend axially from the first surface and engage with and bias the piston away from the clutch pack. The arms extend through the openings and engage the clutch pack. A radial outer portion of the return spring has a first axial thickness and a radial inner portion of the return spring has a second axial thickness that is greater than the first axial thickness.

In yet another respect, the present disclosure is directed to an automatic transmission. The automatic transmission has an input shaft, a gear set, an output shaft, and a fluid actuated brake assembly. The brake assembly includes a housing, a piston, a seal, a clutch pack and a return spring. The housing has an annular recess and an annular groove. The piston is disposed in the annular recess in the housing for axial displacement. The seal prevents passage of a fluid between the housing and the piston. The clutch pack has a set of friction discs intermixed with a set of separator plates. The return spring is a ring-shaped and disposed in the housing between the piston and the clutch pack. The return spring has axially opposite first and second surfaces, an outer periphery, an inner periphery, and a plurality of coil springs. The outer periphery is engaged in the annular groove and prevents axial movement of the return spring. The coil springs extend axially from the first surface and are engaged with and bias the piston away from the clutch pack.

DETAILED DESCRIPTION

Figure 1:
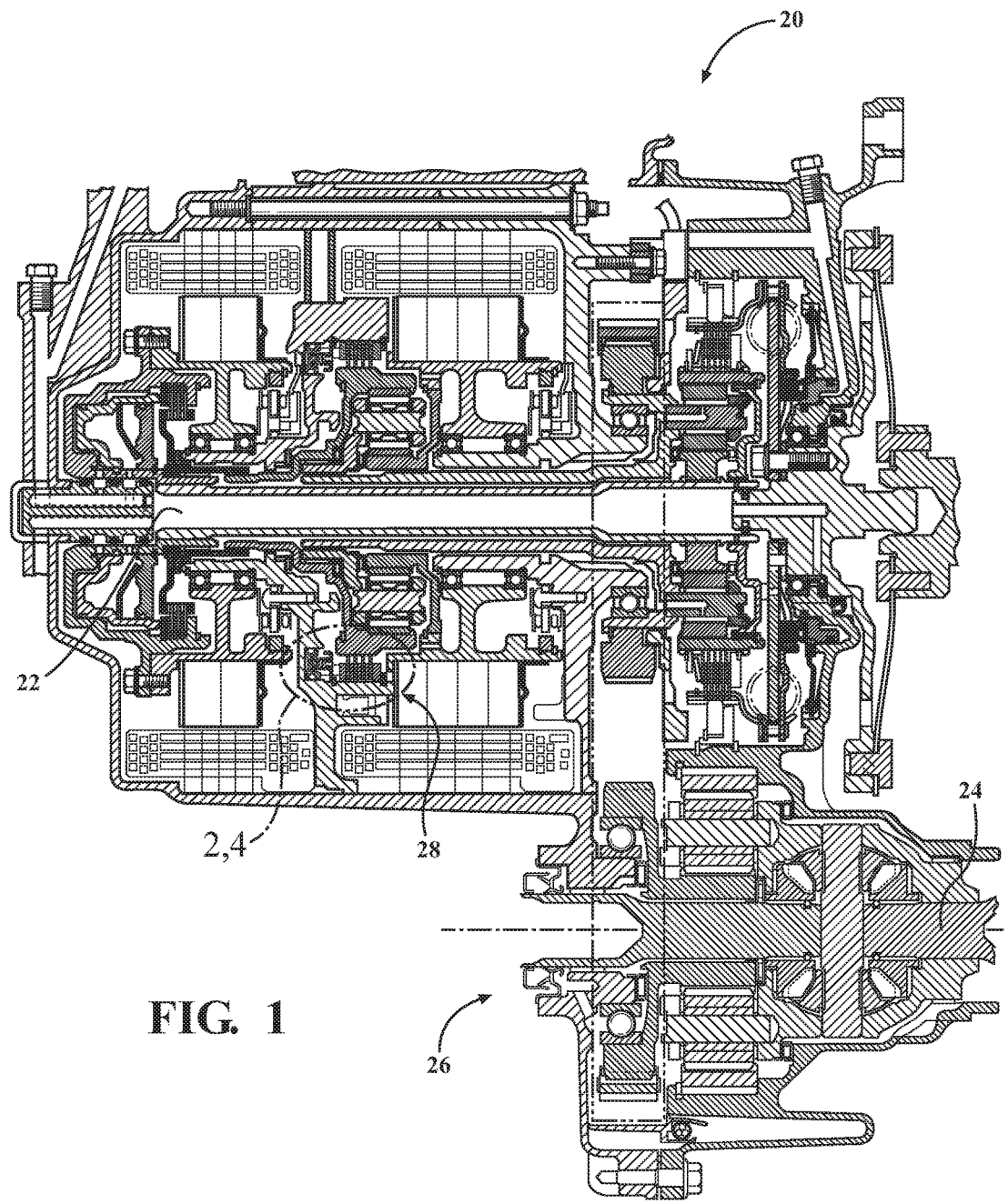
FIG. 1 is a sectional view of an exemplary vehicle transmission having a piston actuated brake.

This detailed description relates to vehicle transmissions having a brake or clutch assembly. The brake assembly includes a piston that moves within a housing in response to fluid pressure and is engaged with a clutch pack. A ring-shaped return spring includes a plurality of coil springs extending axially from a face of the return spring. An outer periphery of the return spring is disposed in an annular groove in the housing which axially fixes the return spring in the housing. The springs are engaged with and bias the piston away from the clutch pack.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an exemplary transmission 20 is shown. Transmission 20 may be used in a vehicle. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle may be a watercraft, an aircraft, a train, a space craft or any other form of motorized transport. Transmission 20 transfers rotation of an input shaft 22 into rotation of an output shaft 24. Output shaft 24, by way of non-limiting example, may be a front axle shaft that is part of a front differential device 26 operatively coupled to transmission 20. Transmission 20 includes a brake assembly 28.

Figure 2:
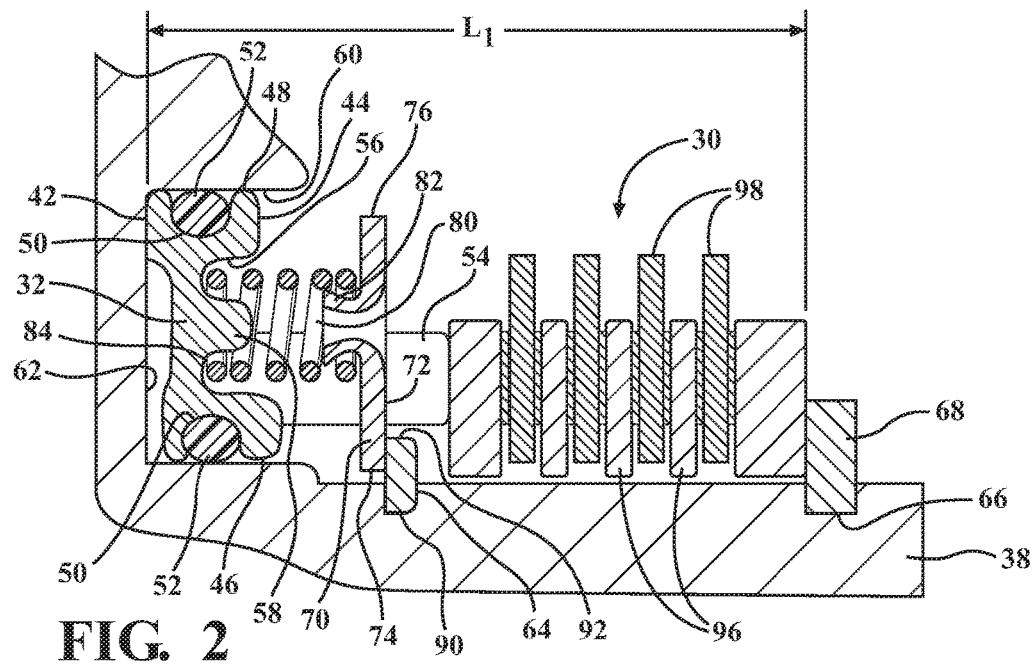
FIG. 2 is a partial sectional view of the transmission of FIG. 1 illustrating a prior art example of a piston actuated brake.
Figure 3:
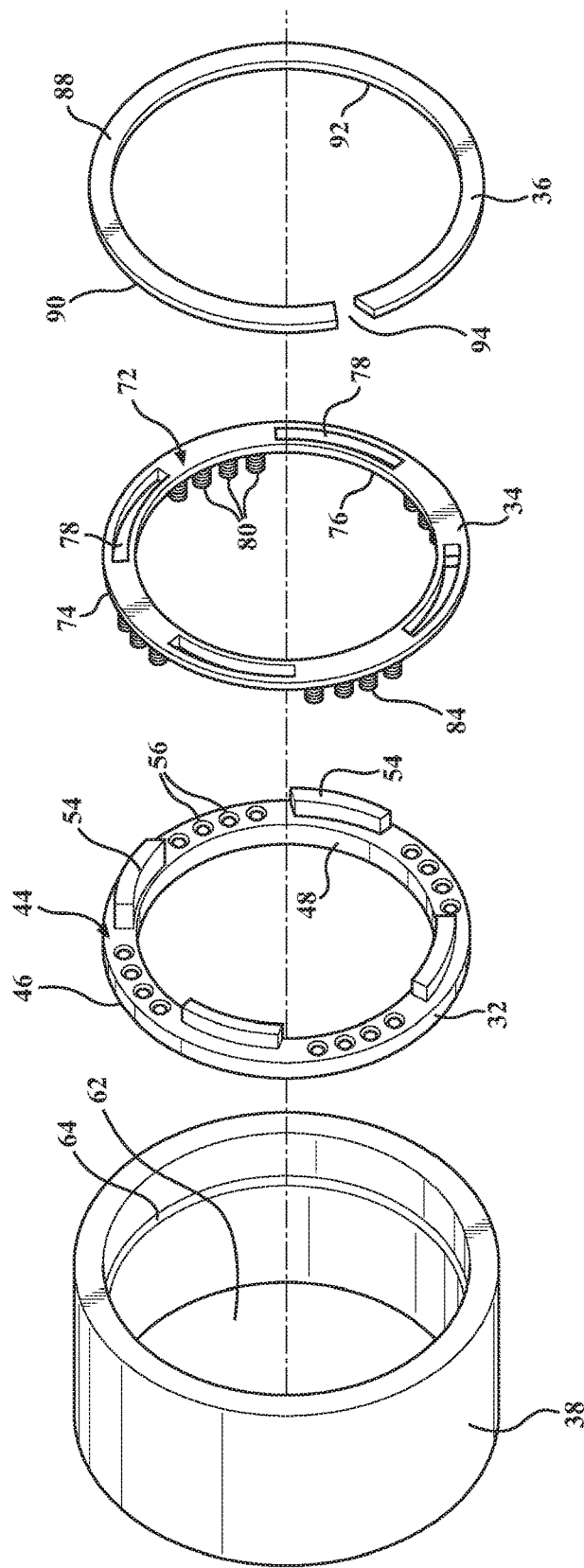
FIG. 3 is an exploded view of the piston actuated brake of FIG. 2.
Figure 5:
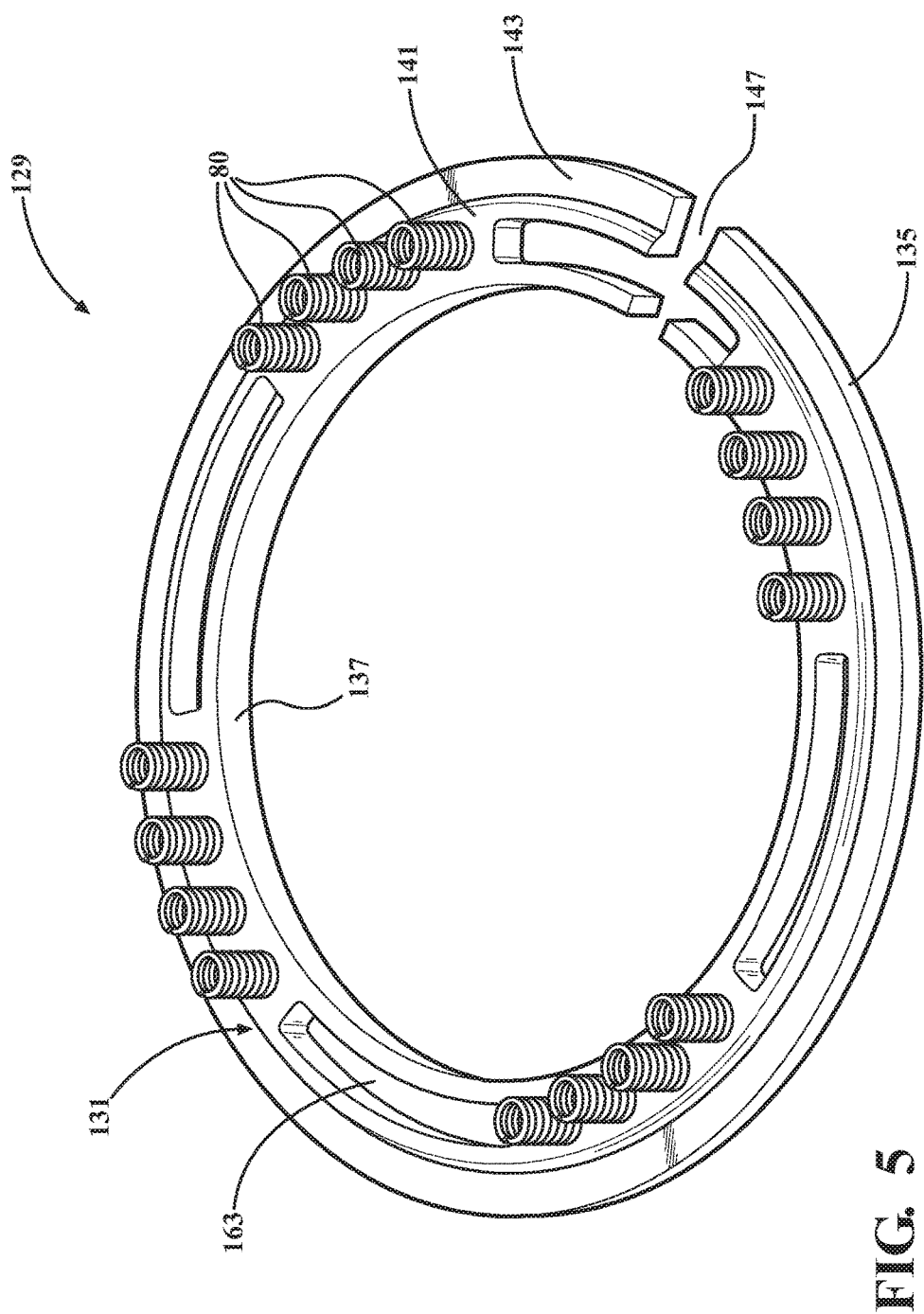
FIG. 5 is a perspective view of a first example of an integrated snap ring and return spring.

A prior art brake or clutch assembly 28, as shown in FIGS. 2 and 3, includes a clutch pack 30, a piston 32, a return spring 34, a snap ring 36 and a housing 38. Piston 32 may be annular with opposite axially facing surfaces 42, 44, an outer periphery 46 and an inner periphery 48. Outer and inner peripheries 46, 48 may each have a groove 50 within which annular seals 52, such as o-rings, may be disposed. A plurality of arms 54 may extend axially outwardly from surface 44 to engage with clutch pack 30, as described below. A plurality of recesses 56, each having a projection 58 may be spaced along surface 44 between arms 54 and engage with return spring 34, as described below.

Housing 38 may include an annular recess 60 adjacent a closed end 62. Seals 52 may form a fluid tight seal within recess 60 so that piston 32 may travel axially within recesses 60 under fluid pressure within recess 60 acting against surface 42, such as hydraulic fluid by way of non-limiting example. Housing 38 may include an annular groove 64 within which snap ring 36 may be disposed. Housing 38 may include another annular groove 66 within which another snap ring 68 associated with clutch pack 30 may be disposed.

Return spring 34 may be annular with opposite axially facing surfaces 70, 72, an outer periphery 74 and an inner periphery 76. A plurality of openings 78 may extend between surfaces 70, 72. Openings 78 are configured to allow arms 54 to move therethrough due to movement of piston 32. A plurality of springs 80 may be disposed along surface 70 and may extend axially outwardly toward piston 32. Springs 80 may be coil springs by way of non-limiting example. Springs 80 may be secured to return spring 34 by extending over and engaging with projections 82 on surface 70. Free ends 84 of springs 80 are disposed in recesses 56 in piston 32 over projections 58. Surface 72 of return spring 34 engages against snap ring 36 and springs 80 bias piston 32 away from clutch pack 30.

Snap ring 36 may be annular with opposite axially facing surfaces 86, 88, an outer periphery 90 and an inner periphery 92. Snap ring 36 is circumferentially discontinuous with a gap 94 that passes entirely through the thickness and width of snap ring 36. Gap 94 allows snap ring 36 to be radially compressed to be fit into groove 64 of housing 38. Inner periphery 92 defines an inner diameter of snap ring 36. The inner diameter is dimensioned so that arms 54 are within inner periphery 92 and piston 32 may travel axially within housing 38.

Clutch pack 30 may include a set of friction discs 96 and a set of separator plates 98 that are axially intermixed in an alternating manner. Friction discs 96 and separator plates 98 may be connected to separate components of transmission 20, such as one set being connected on an inner diameter and the other set being connected on an outer diameter by way of non-limiting example. Clutch pack 30 is disposed between snap rings 64, 68. When fluid pressure acts on piston 32 and overcomes the bias force applied by return spring 34 piston 32 moves away from closed end 62 and arms 54 may press on clutch pack 30 thereby engaging friction discs 96 with separator plates 98. When the fluid pressure is released or reduced the biasing force of return spring 34 moves piston 32 back toward closed end 62 and arms 54 reduce the pressure applied to clutch pack 30. The prior art brake assembly 28 has an axial length L1 between closed end 62 and snap ring 68 on the opposite side of clutch pack 30.

Figure 4:
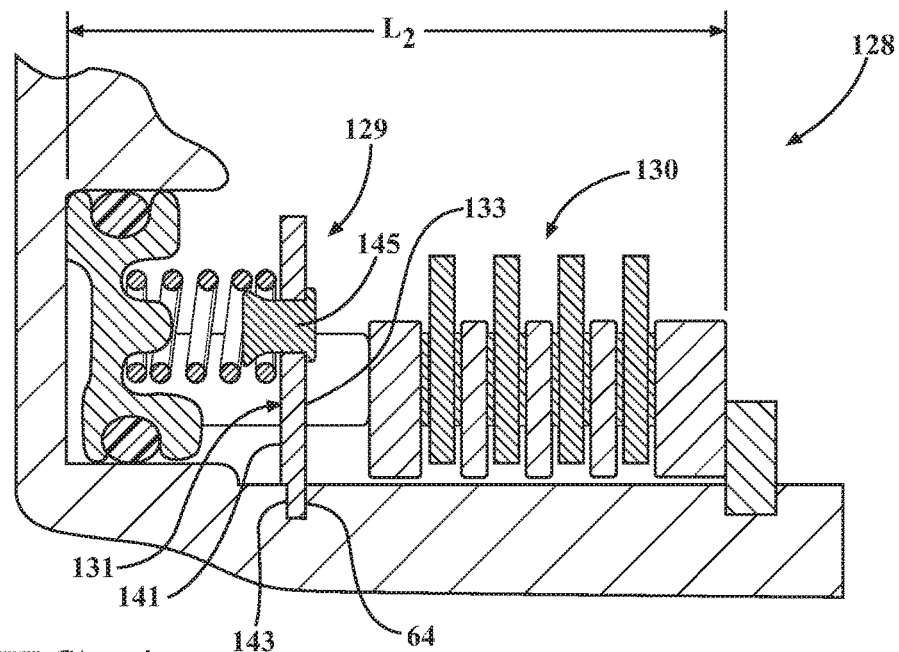
FIG. 4 is a partial sectional view of the transmission of FIG. 1 illustrating a piston actuated brake of the present invention.

Referring now to FIG. 4, a brake or clutch assembly 128 according to the present disclosure is shown. Brake assembly 128 is similar to brake assembly 28 and, as such, only differences will be discussed in detailed. Brake assembly 128 uses a single component to replace snap ring 36 and return spring 34. Specifically, brake assembly 128 utilizes a return spring 129 which may be annular with opposite axially facing surfaces 131, 133, an outer periphery 135 and an inner periphery 137. A plurality of openings 139 may extend between surfaces 131, 133. Openings 139 are configured to allow arms 54 to move therethrough due to movement of piston 32. Surface 131 includes an inner annular portion 141 and an outer annular portion 143 radially outward of inner portion. Outer portion 143 has an axial thickness less than an axial thickness of inner portion 141. Outer portion 143 is configured to fit within groove 64 of housing 38. A plurality of springs 80 may be disposed along inner portion 141 and may extend axially outwardly toward piston 32. Springs 80 may be coil springs by way of non-limiting example. Springs 80 may be secured to return spring 129 by extending over and engaging with studs 145 that extend through return spring 129. In one or more arrangements, projections 82 may be utilized in lieu of studs 145. Free ends 84 of springs 80 are disposed in recesses 56 in piston 32 over projections 58.

Outer portion 143 of return spring 129 engages against groove 64 and springs 80 bias piston 32 away from clutch pack 30. Return spring 129 is circumferentially discontinuous with a gap 147 that passes entirely through the thickness and width of return spring 129. Gap 147 allows return spring 129 to be radially compressed to be fit into groove 64 of housing 38. Return spring 129 advantageously allows brake assembly 128 to have an axial length L2 between closed end 62 and snap ring 68 on the opposite side of clutch pack 30 that is less than length L1 of brake assembly 28. The smaller length L2 results in brake assembly 128 needing a smaller space within transmission 20.

Figure 6:
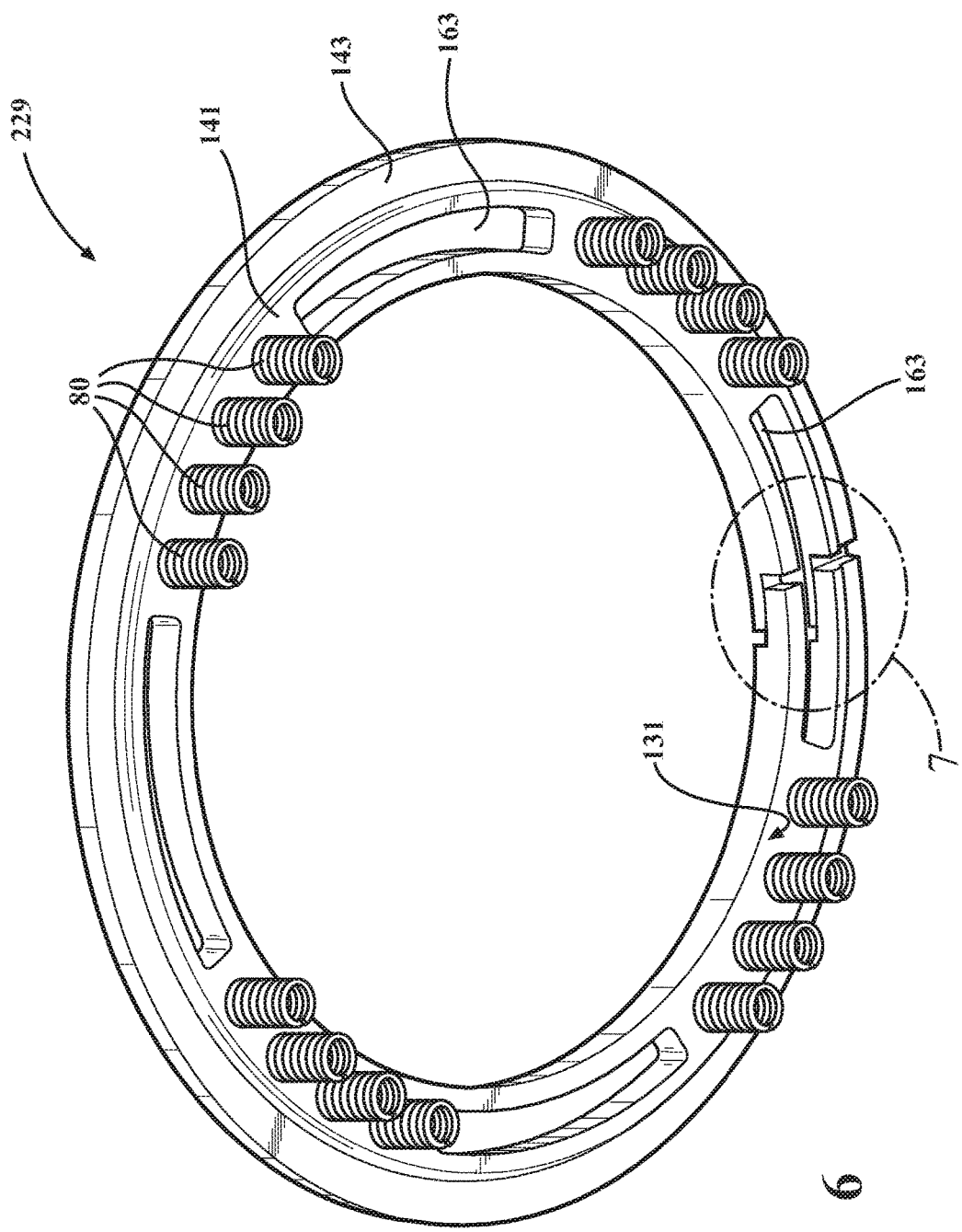
FIG. 6 is a perspective view of a second example of an integrated snap ring and return spring.
Figure 7:
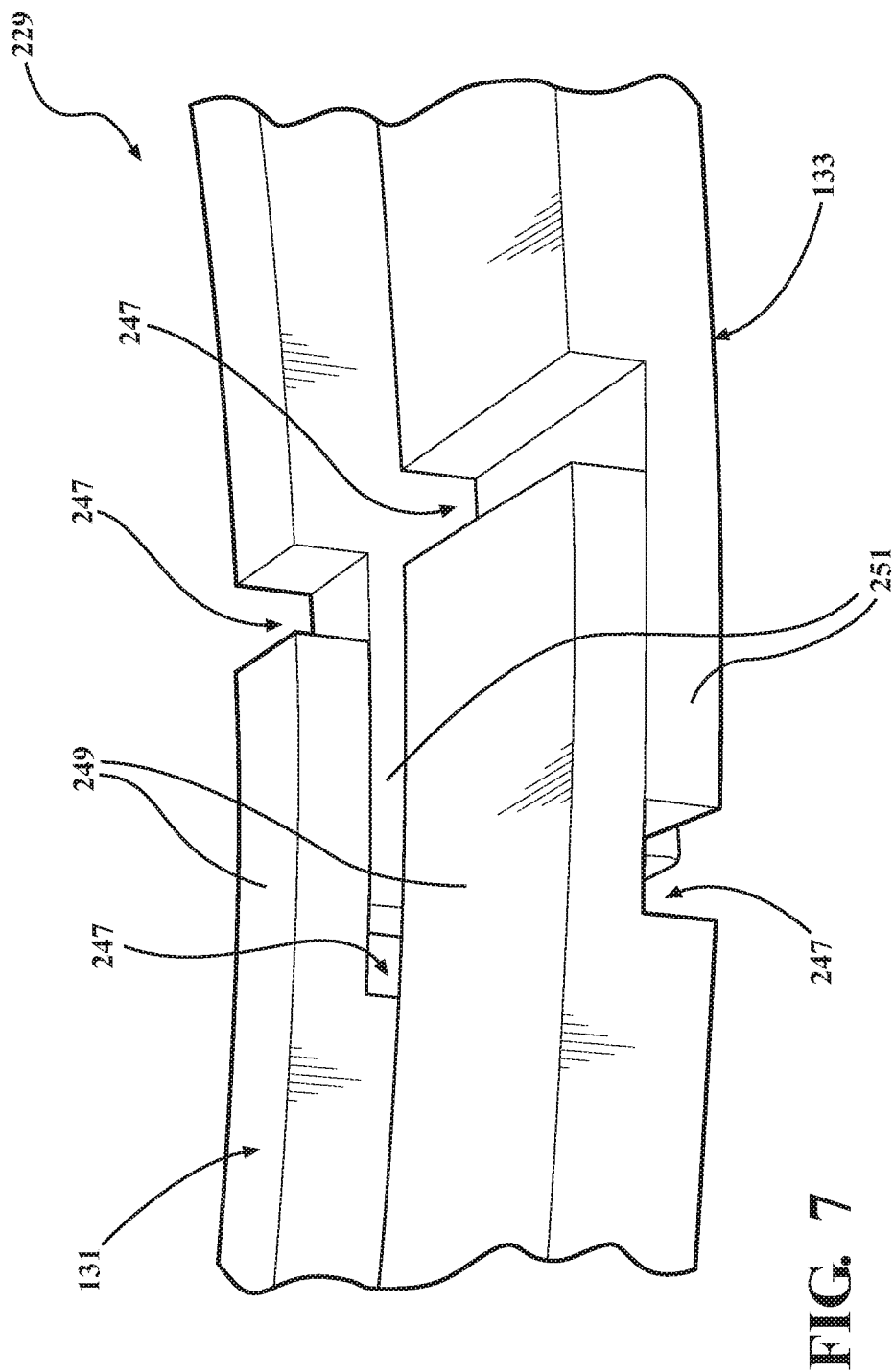
FIG. 7 is an enlarged view of a portion of the integrated snap ring and return spring of FIG. 6.

Referring now to FIGS. 6 and 7, a second embodiment of a return spring 229 for use in brake assembly 128 is shown. Return spring 229 is similar to return spring 129 and, as such, only differences will be discussed in detailed. Return spring 229 is circumferentially discontinuous to allow radial compression and expansion of return spring 229. Gaps 247 are formed between axially spaced apart overlapping arms of return spring 229. In one or more arrangements, the overlapping arms may be formed from a first pair of arms 249 that extend from surface 131 and a second pair of arms 251 that extend from surface 133. Portions of arms 249 overlap portions of arms 251. The overlapping portions do not extend annularly all the way to the facing portions of return spring 229 thereby forming gaps 247. The overlapping portions of arms 249, 251 may move relative to one another to allow radial compression and expansion of return spring 229. The overlapping outer ones of arms 249, 251 have a combined axial dimension that allows them to fit within groove 64. Arms 249, 251 may form a portion of one of openings 163 in return spring 229. The overlapping portions of arms 248, 251 provide for enhanced axially load support during operation of brake assembly 128. Return spring 229 advantageously allows brake assembly 128 to have an axial length L2 between closed end 62 and snap ring 68 on the opposite side of clutch pack 30 that is less than length L1 of brake assembly 28.

Figure 8:
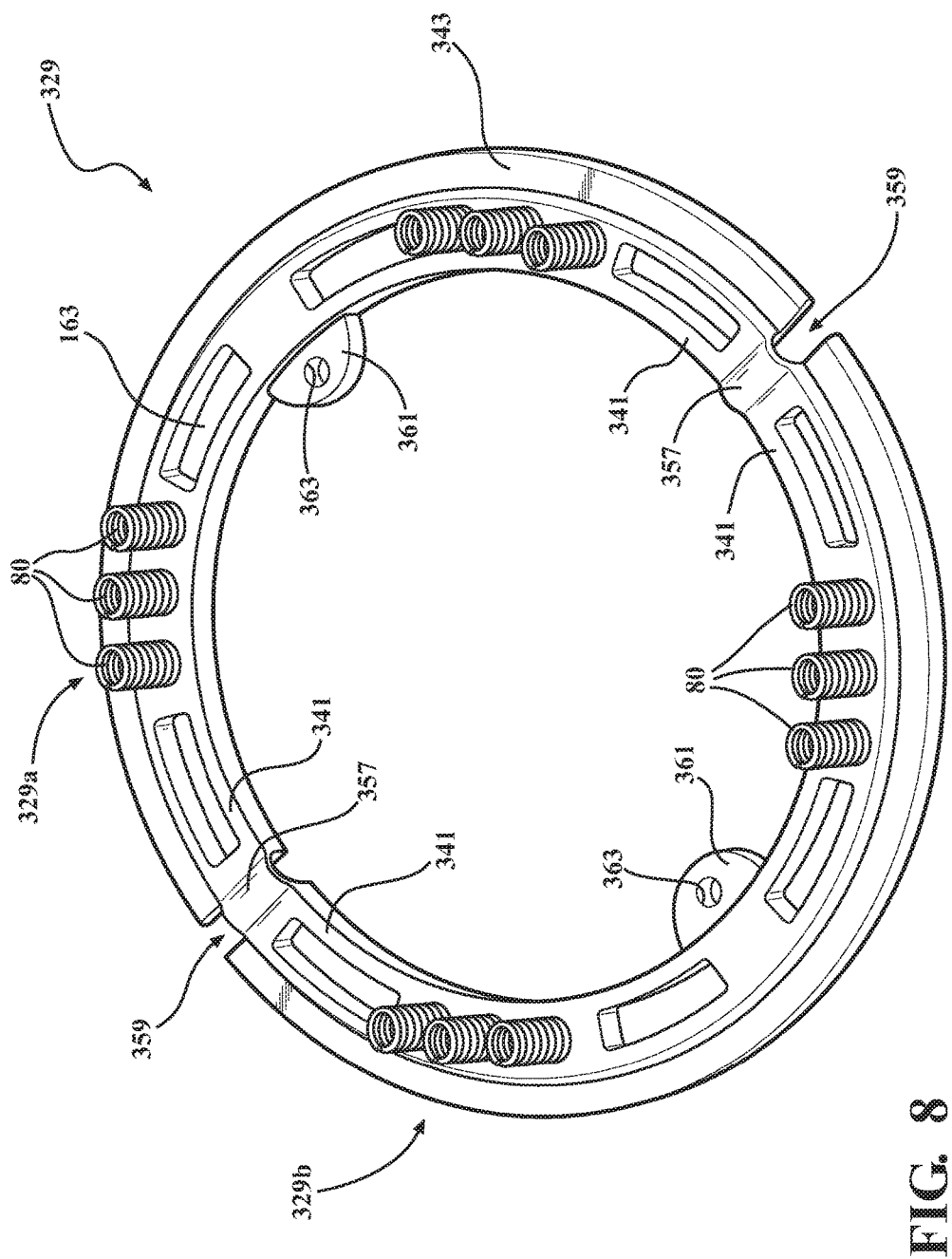
FIG. 8 is a perspective view of a third example of an integrated snap ring and return spring.

Referring now to FIG. 8, a third embodiment of a return spring 329 for use in brake assembly 128 is shown. Return spring 329 is similar to return spring 129 and, as such, only differences will be discussed in detailed. Return spring 329 is circumferentially continuous with a pair of wave springs 357 connecting two halves 329a, 329b of return spring 329. Wave springs 357 may extend between inner portions 341 of halves 329a, 329b with gaps 359 between adjacent inner and outer portions 341, 343. Wave springs 329 and the associated gaps 359 allow radial compression and expansion of return spring 329. A tang 361 may project radially inwardly from each half 329a, 329b. Tangs 361 may each have an opening 363 therein to allow a tool to be inserted into tangs 36 1and radially compress return spring 329 to allow insertion into recess 64. Return spring 329 advantageously allows brake assembly 128 to have an axial length L2 between closed end 62 and snap ring 68 on the opposite side of clutch pack 30 that is less than length L1 of brake assembly 28.

Figure 9:
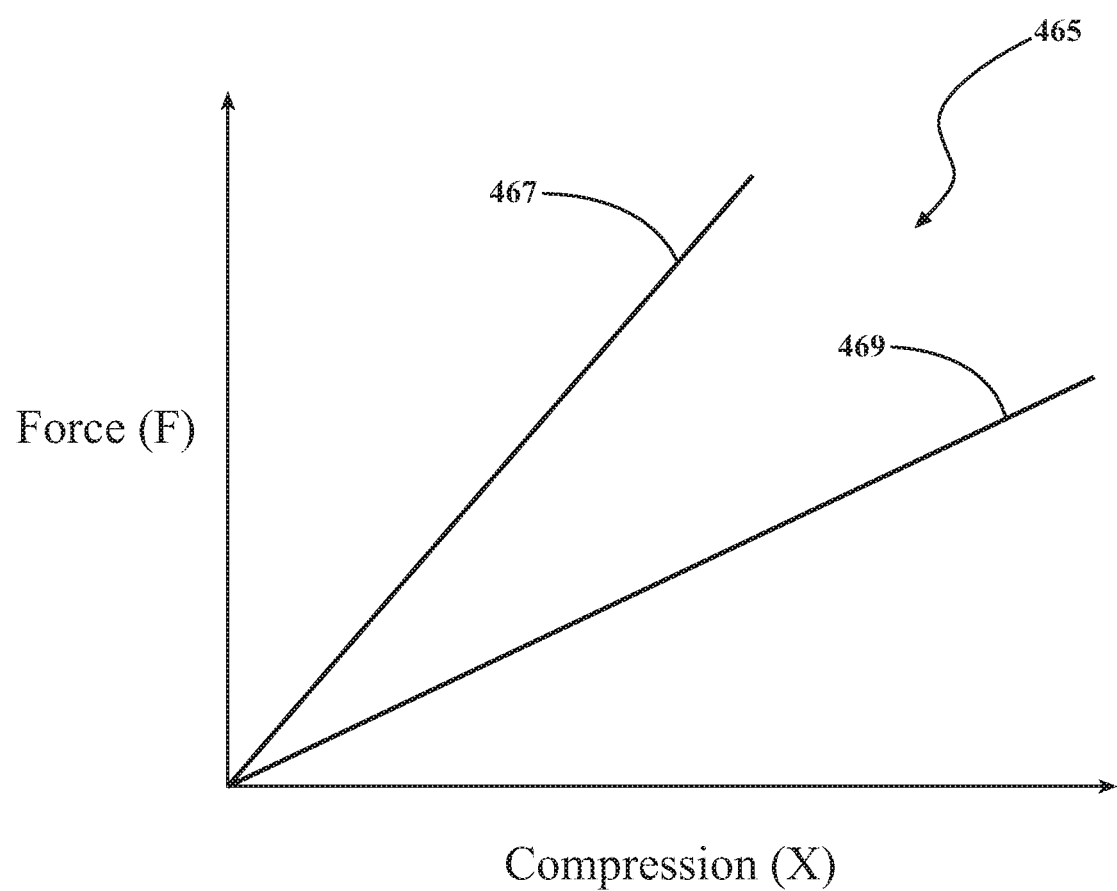
FIG. 9 is an exemplary graph of the spring force as a function of compression for a prior art spring and an integrated snap ring and return spring.

Referring now to FIG. 9, a comparison of the spring force as a function of compression is shown for coil springs and bellow springs which may be used in brake assemblies in transmission. Bellow springs have limited compression and have a spring rate K that is relatively high when compared to that of coil springs that may allow for greater compression and have a lower spring rate K. For example, as shown in graph 465 a bellow spring may generate a force as a function of compression curve 467 while a coil spring may generate a force as a function of compression curve 469. As illustrated, curve 467 is much steeper than curve 469. The limited compression and high force generation as a function of compression in the bellow spring limits the applications in which a brake assembly using a bellow spring may be utilized. These relative characteristics make it difficult to calibrate a brake assembly using a bellows spring to smoothly allow shifting of the transmission. Some smoothness requirements may not be met with bellow springs. In contrast, the use of coil springs results in an easier calibration and allows for smoother shifting of the transmission.

It will be appreciated that arrangements described herein can provide numerous benefits, including one or more of the benefits mentioned herein. For example, arrangements described herein can provide a more compact brake assembly for an automatic transmission. Additionally, the length of the brake assembly may be reduced.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC). The term "operatively connected" as used throughout this description, can include direct or indirect connections, including connections without direct physical contact.

Aspects herein can be embodied in other forms without departing from the spirit or essential attributes thereof. Accordingly, reference should be made to the following claims, rather than to the foregoing specification, as indicating the scope of the invention. It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means plus function format and are not intended to be interpreted based on 35 U.S.C. 112, sixth paragraph, unless and until such claim limitations expressly use the phrase "means for" followed by a statement of function void of further structure.

What is claimed is:

1. A fluid-operated clutch assembly comprising:
 a housing having an annular recess and an annular groove;
 a piston disposed in the annular recess in the housing for axial displacement;

a seal for preventing passage of a fluid between the housing and the piston;

a clutch pack having a set of friction discs intermixed with a set of separator plates; and a ring-shaped return spring disposed in the housing between the piston and the clutch pack, the return spring having axially opposite first and second surfaces, an outer periphery, an inner periphery, the outer periphery being engaged in the annular groove and preventing axial movement of the return spring; and a plurality of coil springs extending axially from the return spring first surface and engaged with and biasing the piston away from the clutch pack, wherein the return spring is circumferentially discontinuous with at least one separating circumferentially spaced apart portions of the return spring, the gap allowing the return spring to be radially compressed to be inserted into the groove.

2. The clutch assembly of claim 1, wherein the return spring includes a pair of overlapping arms and the at least one gap is formed between the overlapping arms.

3. The clutch assembly of claim 1, wherein the return springs includes first and second pairs of overlapping arms, the first pair of overlapping arms adjacent the outer periphery, the second pair of overlapping arms adjacent the inner periphery, and wherein the at least one gap is formed between the pairs of overlapping arms.

4. The clutch assembly of claim 1, wherein a radial outer portion of the return spring has a first axial thickness, a radial inner portion of the return spring has a second axial thickness, and the second axial thickness is greater than the first axial thickness.

5. The clutch assembly of claim 4, wherein the coils springs are disposed on the radial inner portion of the return spring.

6. A fluid-operated clutch assembly comprising:

a housing having an annular recess and an annular groove;

a piston disposed in the annular recess in the housing for axial displacement;

a seal for preventing passage of a fluid between the housing and the piston;

a clutch pack having a set of friction discs intermixed with a set of separator plates; and a ring-shaped return spring disposed in the housing between the piston and the clutch pack, the return spring having axially opposite first and second surfaces, an outer periphery, an inner periphery, the outer periphery being engaged in the annular groove and preventing axial movement of the return spring; and a plurality of coil springs extending axially from the return spring first surface and engaged with and biasing the piston away from the clutch pack, wherein the return spring is circumferentially continuous with first and second portions connected together with a pair of wave springs, the wave springs allowing the return spring to be radially compressed and inserted into the groove.

7. The clutch assembly of claim 1, wherein the return spring includes a plurality of openings extending between the first and second surfaces, the piston has a plurality of axially extending arms, and the arms extend through the openings and engage the clutch pack.

8. A fluid-operated clutch assembly comprising:

a housing having an annular recess and an annular groove;

a piston disposed in the annular recess in the housing for axial displacement, the piston having a plurality of axially extending arms;

a seal for preventing passage of a fluid between the housing and the piston;

a clutch pack having a set of friction discs intermixed with a set of separator plates; and a ring-shaped return spring disposed in the housing between the piston and the clutch pack, the return spring having axially opposite first and second surfaces, an outer periphery, an inner periphery, a plurality of openings extending between the first and second surfaces, and a plurality of coil springs, the outer periphery engaged in the annular groove and preventing axial movement of the return spring, the coil springs extending axially from the first surface and engaged with and biasing the piston away from the clutch pack, the arms extending through the openings and engage the clutch pack, a radial outer portion of the return spring has a first axial thickness, a radial inner portion of the return spring has a second axial thickness, and the second axial thickness is greater than the first axial thickness, wherein the return spring is circumferentially continuous with first and second portions connected together with a pair of wave springs, the wave springs allowing the return spring to be radially compressed and inserted into the groove.

9. An automatic transmission comprising:

an input shaft;

a gear set;

an output shaft; and a fluid actuated brake assembly, the brake assembly including:

housing having an annular recess and an annular groove;

a piston disposed in the annular recess in the housing for axial displacement;

a seal for preventing passage of a fluid between the housing and the piston;

a clutch pack having a set of friction discs intermixed with a set of separator plates; and a ring-shaped return spring disposed in the housing between the piston and the clutch pack, the return spring having axially opposite first and second surfaces, an outer periphery, an inner periphery, the outer periphery being engaged in the annular groove and preventing axial movement of the return spring; and a plurality of coil springs extending axially from the first surface and engaged with and biasing the piston away from the clutch pack, wherein the return spring is circumferentially discontinuous with at least one separating circumferentially spaced apart portions of the return spring, the gap allowing the return spring to be radially compressed to be inserted into the groove.

10. The automatic transmission of claim 9, the return spring includes a pair of overlapping arms and the at least one gap is formed between the overlapping arms.

11. The automatic transmission of claim 9, wherein the return springs includes first and second pairs of overlapping arms, the first pair of overlapping arms adjacent the outer periphery, the second pair of overlapping arms adjacent the inner periphery, and wherein the at least one gap is formed between the pairs of overlapping arms.

12. The automatic transmission of claim 9, wherein a radial outer portion of the return spring has a first axial thickness, a radial inner portion of the return spring has a second axial thickness, and the second axial thickness is greater than the first axial thickness.

13. The automatic transmission of claim 12, wherein the coil springs are disposed on the radial inner portion of the return spring.

14. An automatic transmission comprising:
   an input shaft;
   a gear set;
   an output shaft; and
   a fluid actuated brake assembly, the brake assembly including:
      housing having an annular recess and an annular groove;
      a piston disposed in the annular recess in the housing for axial displacement;
      a seal for preventing passage of a fluid between the housing and the piston;
      a clutch pack having a set of friction discs intermixed with a set of separator plates; and
      a ring-shaped return spring disposed in the housing between the piston and the clutch pack, the return spring having axially opposite first and second surfaces, an outer periphery, an inner periphery, and a plurality of coil springs, the outer periphery engaged in the annular groove and preventing axial movement of the return spring, and the coil springs extending axially from the first surface and engaged with and biasing the piston away from the clutch pack,
   wherein the return spring is circumferentially continuous with first and second portions connected together with a pair of wave springs, the wave springs allowing the return spring to be radially compressed and inserted into the groove.

15. The automatic transmission of claim 9, wherein the return spring includes a plurality of openings extending between the first and second surfaces, the piston has a plurality of axially extending arms, and the arms extend through the openings and engage the clutch pack.

* * * * *

UNITED STATES PATENT AND TRADEMARK OFFICE
CERTIFICATE OF CORRECTION

PATENT NO. : 10,054,173 B2
APPLICATION NO. : 15/240137
DATED : August 21, 2018
INVENTOR(S) : Luke A. Rippelmeyer Page 1 of 1

It is certified that error appears in the above-identified patent and that said Letters Patent is hereby corrected as shown below:

In the Claims

Claim 1, Column 7, Line 15, insert --gap-- before "separating"

Claim 1, Column 7, Line 16, insert --at least one-- before "gap"

Claim 9, Column 8, Line 52, insert --gap-- before "separating"

Claim 9, Column 8, Line 53, insert --at least one-- before "gap"

Signed and Sealed this
Nineteenth Day of February, 2019

Andrei Iancu
*Director of the United States Patent and Trademark Office*